US008072482B2

(12) United States Patent
Gibbs et al.

(10) Patent No.: US 8,072,482 B2
(45) Date of Patent: Dec. 6, 2011

(54) IMAGING SYSTEM HAVING A ROTATABLE IMAGE-DIRECTING DEVICE

(75) Inventors: Daniel P. Gibbs, Murphy, TX (US);
Stacy K. Kniffen, Richardson, TX (US);
Jordan S. Dean, Sachse, TX (US);
Weldon T. Bailey, Wylie, TX (US);
Michael F. Becker, Austin, TX (US)

(73) Assignee: Innovative Signal Anlysis, Richardson, TX (US)

( * ) Notice: Subject to any disclaimer, the term of this patent is extended or adjusted under 35 U.S.C. 154(b) by 1068 days.

(21) Appl. No.: 11/934,344

(22) Filed: Nov. 2, 2007

(65) Prior Publication Data

US 2008/0111881 A1    May 15, 2008

Related U.S. Application Data

(60) Provisional application No. 60/857,905, filed on Nov. 9, 2006.

(51) Int. Cl.
*H04N 7/00* (2006.01)
*H04N 5/225* (2006.01)

(52) U.S. Cl. ........ 348/36; 348/37; 348/335; 348/E5.024

(58) Field of Classification Search .................... 348/36, 348/37, 335, E5.024
See application file for complete search history.

(56) References Cited

U.S. PATENT DOCUMENTS

| | | | | |
|---|---|---|---|---|
| 5,022,723 A | 6/1991 | Schmidt et al. | ................ | 350/1.2 |
| 5,149,969 A | 9/1992 | Fouilloy et al. | ............... | 250/334 |
| 5,610,730 A | 3/1997 | Osipchuk | ...................... | 358/494 |
| 5,721,585 A * | 2/1998 | Keast et al. | ..................... | 348/36 |
| 6,034,716 A * | 3/2000 | Whiting et al. | ................. | 348/36 |
| 6,064,423 A * | 5/2000 | Geng | ............................... | 348/36 |
| 6,147,701 A * | 11/2000 | Tamura et al. | .................. | 348/36 |
| 6,226,035 B1 * | 5/2001 | Korein et al. | ................. | 348/335 |
| 6,304,284 B1 * | 10/2001 | Dunton et al. | ................. | 348/36 |
| 6,335,758 B1 * | 1/2002 | Ochi et al. | ..................... | 348/335 |
| 6,356,296 B1 * | 3/2002 | Driscoll et al. | ................ | 348/36 |
| 6,654,063 B1 * | 11/2003 | Tadatsu | ........................ | 348/373 |
| 6,665,003 B1 * | 12/2003 | Peleg et al. | ..................... | 348/36 |
| 6,717,608 B1 * | 4/2004 | Mancuso et al. | ............... | 348/36 |
| 6,738,073 B2 * | 5/2004 | Park et al. | ..................... | 345/629 |
| 6,765,566 B1 * | 7/2004 | Tsao | ............................. | 345/419 |
| 6,795,113 B1 * | 9/2004 | Jackson et al. | ............. | 348/207.1 |
| 6,831,693 B1 | 12/2004 | Sunaga | ......................... | 348/335 |
| 6,927,905 B1 * | 8/2005 | Kashitani et al. | ............. | 359/402 |
| 6,975,353 B1 * | 12/2005 | Milinusic et al. | .......... | 348/218.1 |
| 7,058,239 B2 * | 6/2006 | Singh et al. | ................... | 382/284 |
| 7,092,132 B2 * | 8/2006 | Matsuda | ....................... | 358/474 |
| 7,136,096 B1 * | 11/2006 | Yamagishi et al. | ........ | 348/218.1 |
| 7,206,017 B1 * | 4/2007 | Suzuki | ............................ | 348/36 |
| 7,256,834 B1 * | 8/2007 | Sagefalk et al. | ............... | 348/373 |
| 7,301,557 B2 * | 11/2007 | Kakou et al. | .................... | 348/36 |

(Continued)

FOREIGN PATENT DOCUMENTS

GB    2239762 A    10/1991

*Primary Examiner* — Alina Boutah
(74) *Attorney, Agent, or Firm* — Westman, Champlin & Kelly, P.A.

(57) ABSTRACT

An image acquisition system for capturing images of a scene is provided. The system includes a stationary image acquisition device that receives optical images. A light-directing device directs images toward the image acquisition device. The light-directing device pivots about a pivot axis over a scan range that is less than 360 degrees.

20 Claims, 7 Drawing Sheets

U.S. PATENT DOCUMENTS

| | | | |
|---|---|---|---|
| 7,489,330 B2 * | 2/2009 | Hayashi et al. | 348/36 |
| 7,495,694 B2 * | 2/2009 | Cutler | 348/218.1 |
| 7,528,864 B2 * | 5/2009 | Sassa | 348/218.1 |
| 7,710,463 B2 * | 5/2010 | Foote | 348/218.1 |
| 7,884,848 B2 * | 2/2011 | Ginther | 348/36 |
| 2002/0024599 A1 * | 2/2002 | Fukuhara et al. | 348/169 |
| 2002/0109772 A1 * | 8/2002 | Kuriyama et al. | 348/36 |
| 2003/0142203 A1 * | 7/2003 | Kawakami et al. | 348/36 |
| 2004/0021766 A1 * | 2/2004 | Daniilidis et al. | 348/36 |
| 2004/0061774 A1 * | 4/2004 | Wachtel et al. | 348/36 |
| 2005/0259146 A1 * | 11/2005 | Berdugo | 348/36 |
| 2006/0072020 A1 * | 4/2006 | McCutchen | 348/218.1 |
| 2006/0268102 A1 * | 11/2006 | Ginther | 348/36 |
| 2008/0068451 A1 * | 3/2008 | Hyatt | 348/36 |

* cited by examiner

IMAGING SYSTEM HAVING A ROTATABLE IMAGE-DIRECTING DEVICE

The present application is based on and claims the benefit of U.S. Provisional Patent Application Ser. No. 60/857,905, filed on Nov. 9, 2006, the content of which is hereby incorporated by reference in its entirety.

BACKGROUND

The present disclosure relates generally to imaging systems, and more specifically, but not by limitation, to imaging systems configured to acquire image data of a wide area scene.

There are known imaging systems for capturing image data of a wide area scene (e.g., image data of a panoramic scene having a wide field-of-view (FOV)). There are also imaging systems that are configured to acquire multiple image frames of a wide area scene and utilize the multiple frames to construct a digital representation of the wide area scene. Further, some of these conventional systems employ a rotating mirror to reflect images to a camera. Unfortunately, these conventional systems commonly require complex hardware and software components to acquire and process the captured images. Many of these conventional systems have a low spatial resolution and significant image distortion. Further, the rotating mirror mechanisms employed by conventional systems skew and distort the reflected images. For instance, these conventional systems employ a mirror orientation that causes the reflected images to rotate on a lens of the camera.

For at least these reasons, there is a need for an image acquisition system that collects video data at a high rate, at a high spatial resolution, and without image distortion commonly seen with conventional systems.

The discussion above is merely provided for general background information and is not intended to be used as an aid in determining the scope of the claimed subject matter.

SUMMARY

An image acquisition system for capturing images of a scene is provided. The system includes a stationary image acquisition device that receives optical images. A light-directing device directs images toward the image acquisition device. The light-directing device pivots about a pivot axis over a scan range that is less than 360 degrees.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
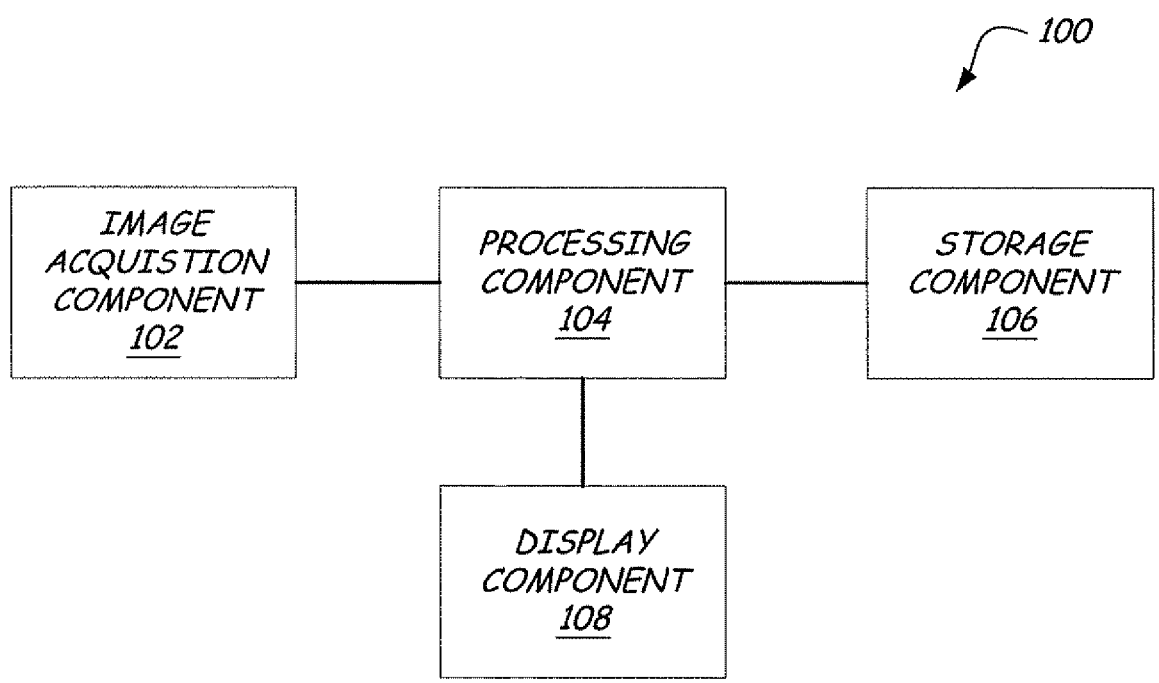
FIG. 1 is a schematic diagram illustrating an image acquisition system, under one embodiment.

FIG. 1 is a schematic diagram of a system 100 for acquiring and processing image data, including displaying, storing, and/or transmitting the image data. System 100 includes an image acquisition component 102 configured to receive an optical image and generate a digital representation of the optical image. In one embodiment, image acquisition component 102 is a camera configured to acquire images such as still images and/or video. Data acquired by image acquisition component 102 can be provided in any suitable image format including, but not limited to, raw binary, AAF, 3GP, GIF, Animated GIF, ASF, AVI, MPEG (i.e., MPEG-1, MPEG-2, MPEG-3, MPEG-4), AVCHD (Advanced Video Codecs High Definition), DSH, FLV, MOV, WMV, JPG, GIF, TIFF, PNG, BMP, to name a few.

Image acquisition component 102 is configured to capture image data over a wide spatial area (i.e., a substantially wide field-of-view). In this manner, image acquisition component 102 can acquire image data of a panoramic scene, such as a landscape. In one embodiment, image acquisition component 102 is stationary with respect to the surrounding landscape and includes a rotatable image-directing device, such as a mirror and/or a prism. In another embodiment, image acquisition component 102 includes a camera that pans (i.e., rotates) from side-to-side while acquiring video and/or a series of still images. In another example, image acquisition component 102 includes a wide-angle lens to capture panoramic image data. Although not illustrated in FIG. 1, image acquisition component 102 can include additional media acquisition components, such as a microphone.

The image data acquired by image acquisition component 102 is provided to a processing component 104 configured to perform processing operations such as image processing, image target tracking, image change detection, etc. Processing component 104 is configured to collect the image data and associate, with the acquired image data, information such as a time stamp indicative of when the image data was acquired and/or a location identifier indicative of a spatial position of the acquired image data. For example, in the case where a plurality of images frames are acquired over a wide area scene, the processing component 104 can assign information to each acquired frame indicative of the spatial position of the frame within the wide area scene.

Further, processing component 104 is configured to receive a plurality of frames of image data and perform image data processing to arrange the plurality of frames. In one embodiment, processing component 104 performs "autostitch" processing in which a plurality of frames of acquired imaged data are arranged side-by-side to form a wide area image. Further, spatial position information associated with each frame (e.g., information indicative of the location of the particular frame within the wide area image) can be utilized to arrange the plurality of frames together to form the wide area image.

Raw (i.e., unprocessed data) and/or processed image data can be provided to a storage component 106. Storage component 106 is configured to archive image data for storage and/or subsequent retrieval. For example, the image data can be compressed to reduce the required memory for storing and/or transmitting the image data. Processing component 104 can further be configured to retrieve stored data from storage component 106.

In the illustrated embodiment, processing component 104 is further configured to provide image data to a display component 108. Display component 108 includes a visual display device, such as a monitor, for visually rendering the image data. In one embodiment, display component 108 includes an array of monitors configured to simultaneously display a plurality of frames of image data acquired by image acquisition component 102. Display component 108 receives the acquired image data and visually renders the image data. As discussed above, spatial information relating to a position of the frame(s) of image data can be provided and can be utilized to visually render the image data.

Figure 2:
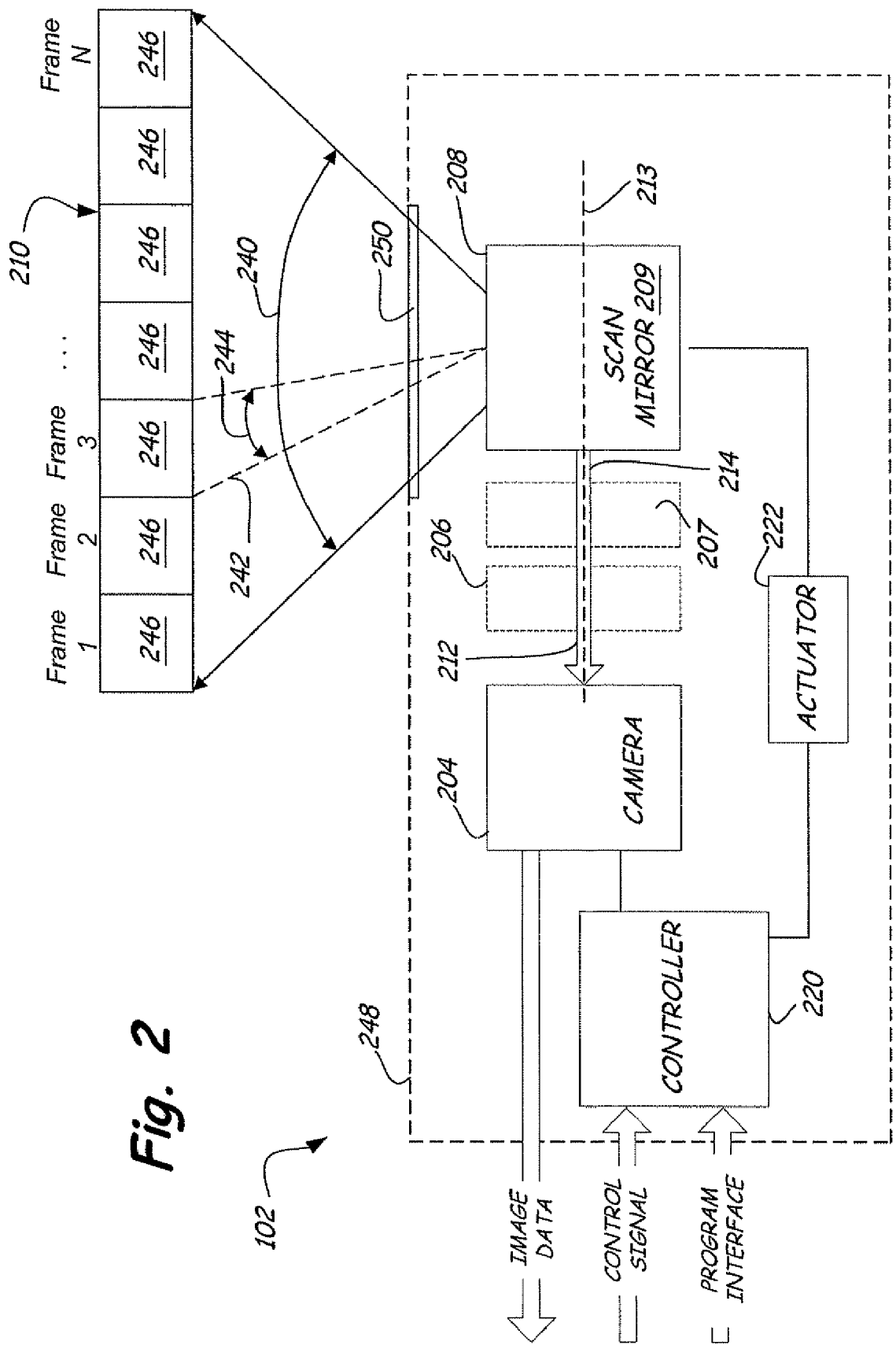
FIG. 2 is a schematic diagram illustrating an image acquisition component, under one embodiment.

FIG. 2 is a schematic diagram illustrating one embodiment of image acquisition component 102. In the illustrated embodiment, a camera 204 is provided and is configured to receive an optical image 212 of a scene 210 along an optical axis 213. It is noted that herein "optical axis" is utilized to refer to an optical image path along which camera 204 receives image data. The optical axis can be perpendicular to, or alternatively at an angle with respect to, a lens of camera 204. Further, camera 204 is configured to acquire optical images centered along optical axis 213, as well as optical images that are at an angle with respect to optical axis 213. In other words, camera 204 has a field-of-view, wherein light is accepted at all angles with the field-of-view.

Camera 204 can be any suitable image acquisition device. In one embodiment, camera 204 is configured to acquire images at a rate of 60 frames-per-second (fps). In other embodiments, camera 204 can acquire more than, or less than, 60 fps. For example, camera 204 can be configured to operate at 200 fps.

As illustrated in FIG. 2, image acquisition component 102 is configured to acquire a plurality of frames 246 of image data from scene 210. In the illustrated embodiment, camera 204 is mounted in a stationary, or substantially stationary, position with respect to scene 210. To acquire the plurality of image frames 246 of scene 210, an image-directing device 208 is provided for directing an optical image 212 to camera 204 along an optical image path 214. In the embodiment illustrated in FIG. 2, the image directing device 208 includes a single scan mirror 209 configured to pivot about a pivot axis (not shown in FIG. 2). However, it is noted that in other embodiments image-directing device 208 can include a plurality of mirrors. For example, the image-directing device 208 can include a plurality of scan mirrors 209 configured to pivot about one or more pivot axes. Further, the image-directing device 208 can also include one or more stationary mirrors for directing images to camera 204.

Camera 204 collects light energy reflected by light-directing device 208 along optical image path 214. Herein, the term "light", or "light energy", is utilized to refer to, in addition to "visible light", electromagnetic radiation having wavelengths less than or greater than "visible light." For example, the term "light", or "light energy", can refer to infrared or near-infrared radiation, ultra-violet radiation, among others. In one embodiment image acquisition component 102 includes a multispectral and/or a hyperspectral imaging camera configured to simultaneously acquire images at multiple wavelengths.

At a particular angular position of scan mirror 209, camera 204 receives image data from a frame 246 of scene 210 and has a field-of-view (FOV) 244 at a standoff range 242. In one embodiment, FOV 244 of camera 204 is approximately one (1) degree with respect to the pivot axis of scan mirror 208. However, camera 204 and scan mirror 209 can have any suitable FOV 244. For instance, FOV 244 can be less than, or greater than, one degree depending on the desired application of image acquisition component 102. A suitable FOV 244 can be 0.3-10 degrees, for example. Further, in one embodiment standoff range 242 is approximately four (4) miles in length. However, standoff range 242 can be any suitable distance. For instance, standoff range 242 can be less than, or greater than, four miles depending on the desired application of image acquisition component 102.

Pivoting of scan mirror 209 enables camera 204 to acquire image data from each of the plurality of frames 246 over a scan range 240. In one embodiment, scan range 240 is approximately eighty (80) degrees (with respect to the pivot axis of scan mirror 208). In one particular example, scan range 240 corresponds to a spatial width of scene 210 of approximately 7 miles. In other embodiments, scan range 240 can be greater than, or less than, 80 degrees. By acquiring each of frames 246 using scan mirror 209, camera 204 can acquire image data of scene 210 having a relatively high spatial resolution (i.e., "zoomed in"). In one embodiment, camera 204 has a ground sampling distance (GSD) of approximately six (6) inches at a standoff range 242 of three (3) miles.

To enable scan mirror 209 to pivot over scan range 240, an actuator 222 is operably coupled to electronics controller 220 and scan mirror 209, and is configured to step scan mirror 209 through scan range 240 between each of a plurality of angular positions in response to a signal from controller 220. Actuator 222 is configured to pivot scan mirror 209 through scan range 240 in successive and repeating cycles. As illustrated, a complete "scan" of mirror 209 can obtain a total of "N" image frames 246. In one embodiment, scan mirror 209 "steps" through scene 210 to acquire 80 (i.e., "N"=80) frames. However, any number of frames "N" can be acquired. As will be discussed below, in one embodiment the "N" image frames 246 are subsequently arranged to form a 1×N wide area image of scene 210.

In the illustrated embodiment, controller 220 is configured to receive a control signal to control operation of components of image acquisition component 102. For instance, the control signal can include an activation signal and/or information regarding operation of camera 204 and/or scan mirror 209. Controller 220 is operably coupled to actuator 222 and camera 204 and synchronizes the timing between the scan mirror 209 and camera 204. In one embodiment, the controller 220 implements a field programmable gate array (FPGA) and/or includes calibration information. For instance, to calibrate the scan angles (i.e., scan mirror 209 step size), a re-configurable look-up-table (LUT) is loaded into a FPGA-based controller. The LUT maps the camera FOV 244 to the angular step size of the scan mirror 209 to limit overlapping data and gaps in the acquired image data for adjacent frames 246 of scene 210. In one embodiment, for each successive cycle of scan mirror 209 through scan range 240, image data received from a particular frame 246 (e.g., Frame 1, Frame 2, Frame N) for each successive scan is received from substantially the same spatial location within scene 210. In other words, each frame 246 of image data received at camera 204 for each successive cycle of scan mirror 209 defines substantially the same spatial boundaries within scene 210. Preferably, overlapping data or gaps in the image data is minimized.

Further, the LUT can be re-configured either automatically or based on user entered parameters. For instance, in one embodiment the LUT is reconfigured automatically based on acquired image data. For example, if image processing determines that adjacent image frames 246 contain overlapping image data or significant gaps therebetween, the LUT can be automatically adjusted to modify the angular position of scan mirror 209 at the particular frame(s) to reduce the gaps and/or overlapping image data. In another embodiment, a user inspects the image data and, using a graphical user interface, makes manual adjustments to reduce the gaps and/or overlapping image data. In one embodiment, calibration information is provided to controller 220 over a program interface. For example, controller software provided in processing component 104, described below, can include instructions for programming controller 220

Controller 220 sends a signal to actuator 222 to quickly "step" the scan mirror 209 between adjacent frames in approximately a few milliseconds. For example, the scan mirror 209 can have a 0.5 degree step response time of 1.5 ms. The controller 220 also sends a signal to the camera 204 to cause the camera to acquire an optical image of the particular frame 246 while scan mirror 209 "stares" at the particular frame. Preferably, controller 220 synchronizes the timing between the scan mirror 209 and camera 204 such that there is limited image smear and ghosting in the acquired image data. In accordance with another embodiment, scan mirror 209 is configured to pivot through scan range 240 using a continuous motion. In other words, in this embodiment scan mirror 209 does not stop and "stare" at each frame 246. Instead, camera 204 is configured to acquire each frame 246 of image data as scan mirror 209 moves continuously through scan range 240.

As discussed above, scan mirror 209 can be configured to pivot through scan range 240 in successive and repeating cycles. For instance, when scan mirror 209 reaches a boundary of the scan range 240, for example scan mirror 209 is acquiring optical image data from frame "N", the scan mirror 209 is configured to return to the first frame (i.e., "frame 1") in scan range 240 to acquire another series of images from frames 243 of scene 210. In another embodiment, the scan mirror 209 can be configured to reverse direction to acquire image data from the plurality of frames 246 in reverse order. Thus, image acquisition component 102 is configured to repeatedly acquire image data from frames 246 of scene 210 in a back-and-forth pivoting manner. In one example, the image data for each frame 246 is updated (i.e., additional image data is acquired for the frame) one or more times a second resulting in a framing rate of 1 Hz or greater. In another example, the framing rate is less than 1 Hz (i.e., image data is acquired for each frame 246 less than once per second). As will be discussed below in greater detail, the series of updated image data for each frame 246 is provided to processing component 104. In one example, the image data is utilized to generate a video stream.

In accordance with one embodiment, scan mirror 209 directs optical image 212 toward a stationary imaging lens 206 associated with camera 204. The optical image 212 is received through lens 206 and aperture stop 207 along the optical axis 213. Camera 204 generates a digital data representation of the optical image 212 which can be provided to processing component 104, illustrated in FIG. 1. In one embodiment, the lens 206 has a focal length of approximately 70-500 mm. Further, the lens can include a filter for blocking electromagnetic radiation having particular wavelengths. For example, the filter can be configured to block at least a portion of UV light and/or light in the blue range of the visible light spectrum (i.e., wavelengths of 450-495 nm). The aperture stop 207 is positioned between the lens 206 and image directing device 208 and is centered on the optical axis 212.

In the illustrated embodiment, components of image acquisition component 102 are provided in an enclosure 248 configured to protect the components from environmental elements. Enclosure 248 can include a window 250 through which image data from scene 210 is acquired. While controller 220 is illustrated within enclosure 248, it is noted that controller 220 can be provided external to enclosure 204. For instance, controller 220 can be remotely positioned from camera 204, such as within processing component 104.

FIGS. 3-7 illustrate embodiments of camera 204 and image directing device 208. As discussed above, image directing device 208 directs optical images to camera 204 along an optical image path 214. Camera 204 receives the optical images from the optical image path 214 along an optical axis 213. Further, as discussed above, image directing device 208 can include a single scan mirror 209 configured to pivot about an axis. Further, image directing device 208 can include a plurality of mirrors. For example, image directing device 208 can include a plurality of scan mirrors 209 configured to pivot about one or more pivot axes. Further yet, the image-directing device 208 can also include one or more stationary mirrors.

Figure 3:
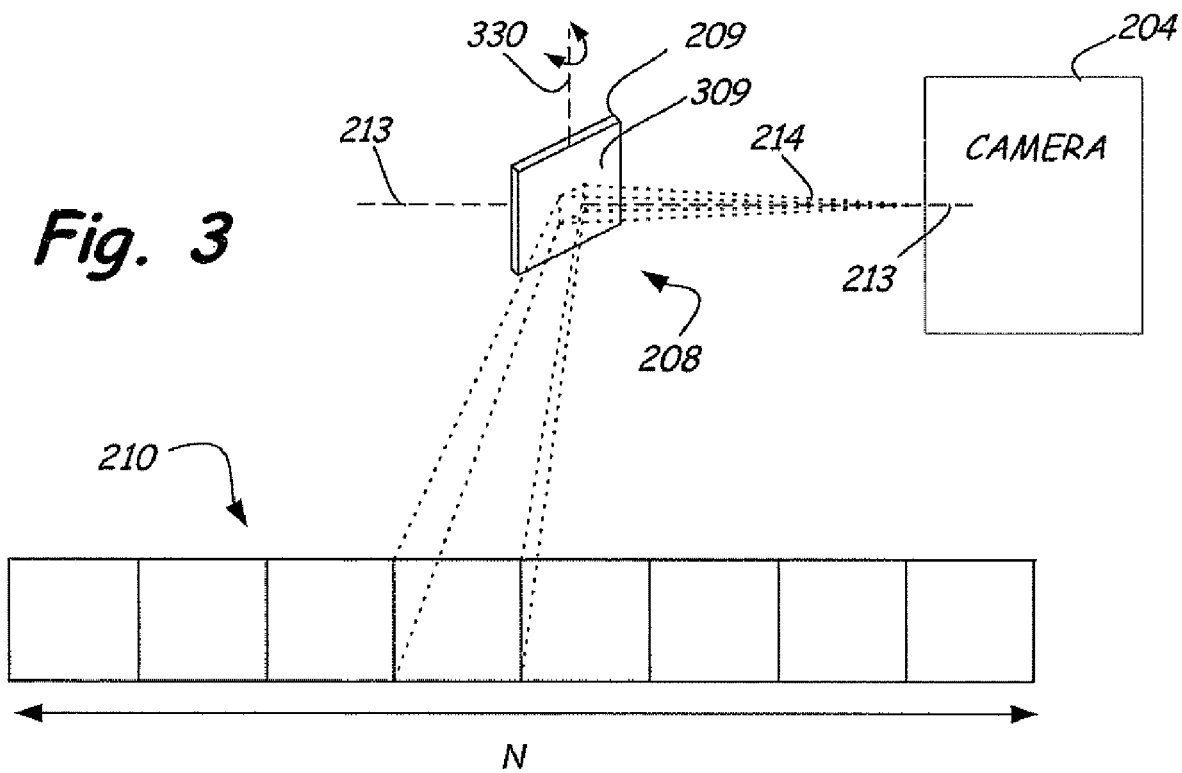
FIGS. 3 and 4 illustrate image acquisition systems configured to perform a one-dimensional (1-D) scan to acquire images of a scene.
Figure 4:
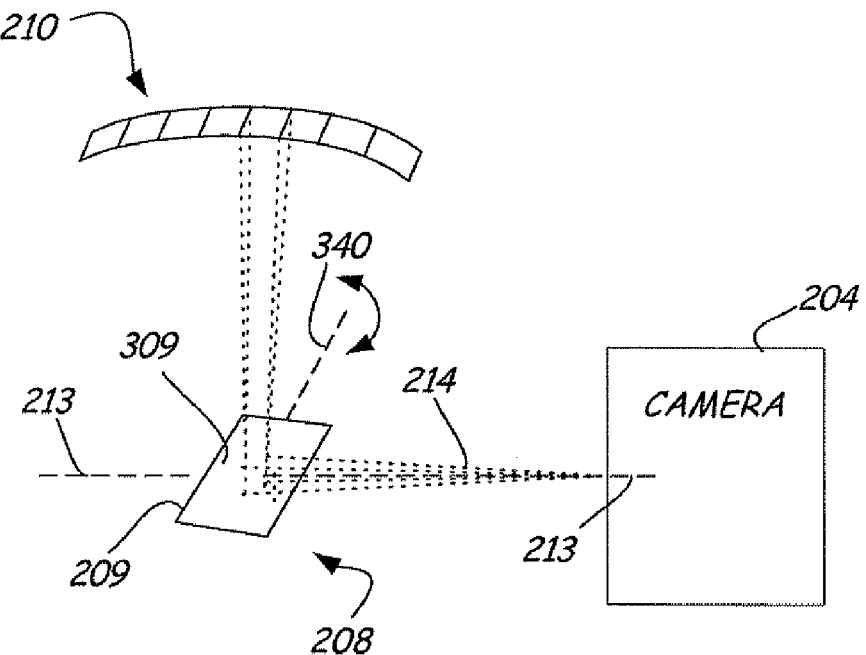

In the embodiments illustrated in FIGS. 3 and 4, image directing device 208 is configured to perform a one-dimensional scan of scene 210. As illustrated in FIG. 3, camera 204 is focused on a portion of scan mirror 209 and is configured to receive optical images along optical image axis 213. Images of scene 210 are directed by scan mirror 209 along an optical image path 214 to camera 204. In the illustrated embodiment, scan mirror 209 is configured to pivot about a single axis 330 that is substantially perpendicular to optical axis 213 to minimize distortion of the reflected images. Scan mirror 209 pivots over a scan range of less than 360 degrees. In one example, the scan range is less than 90 degrees. Further, as illustrated in FIG. 3 axis 330 is substantially parallel to a light-reflecting surface 309 of mirror 209. In one example, axis 330 is substantially in the same plane as the light-reflecting surface 309 of mirror 209. Camera 204 and light directing device 208 can be positioned at ground level or, alternatively, above ground level. For example, camera 204 can be mounted on a support, such as a post, a distance above the ground. In the illustrated embodiment, scan mirror 209 is configured to pivot about a substantially vertical axis 330. As such, camera 204 acquires images at a viewing angle that is substantially parallel to the ground (i.e., perpendicular to the vertical axis 330). In another embodiment, axis 330 can be oriented at an angle with respect to vertical. In this manner, camera 204 acquires images at a particular viewing angle with respect to the ground.

Because pivot axis 330 is substantially perpendicular to optical axis 213, frames of image data acquired from scene 210 are oriented in the substantially the same direction at all positions of scan mirror 209. In other words, as scan mirror 208 pivots about axis 330 the orientation of the image frames does not rotate on a lens of camera 204.

In the embodiment illustrated in FIG. 4, camera 204 acquires image data of a scene 210 that is oriented in a generally vertical direction. In this embodiment, scan mirror 209 is configured to pivot about a pivot axis 340 that is substantially perpendicular to optical axis 213 to direct images to camera 204 along optical image path 214. As illustrated in FIG. 4, axis 340 is substantially parallel to a light-reflecting surface 309 of mirror 209. In one example, axis 340 is substantially in the same plane as the light-reflecting surface 309 of mirror 209 and is oriented in a horizontal, or substantially horizontal, direction.

Figure 5:
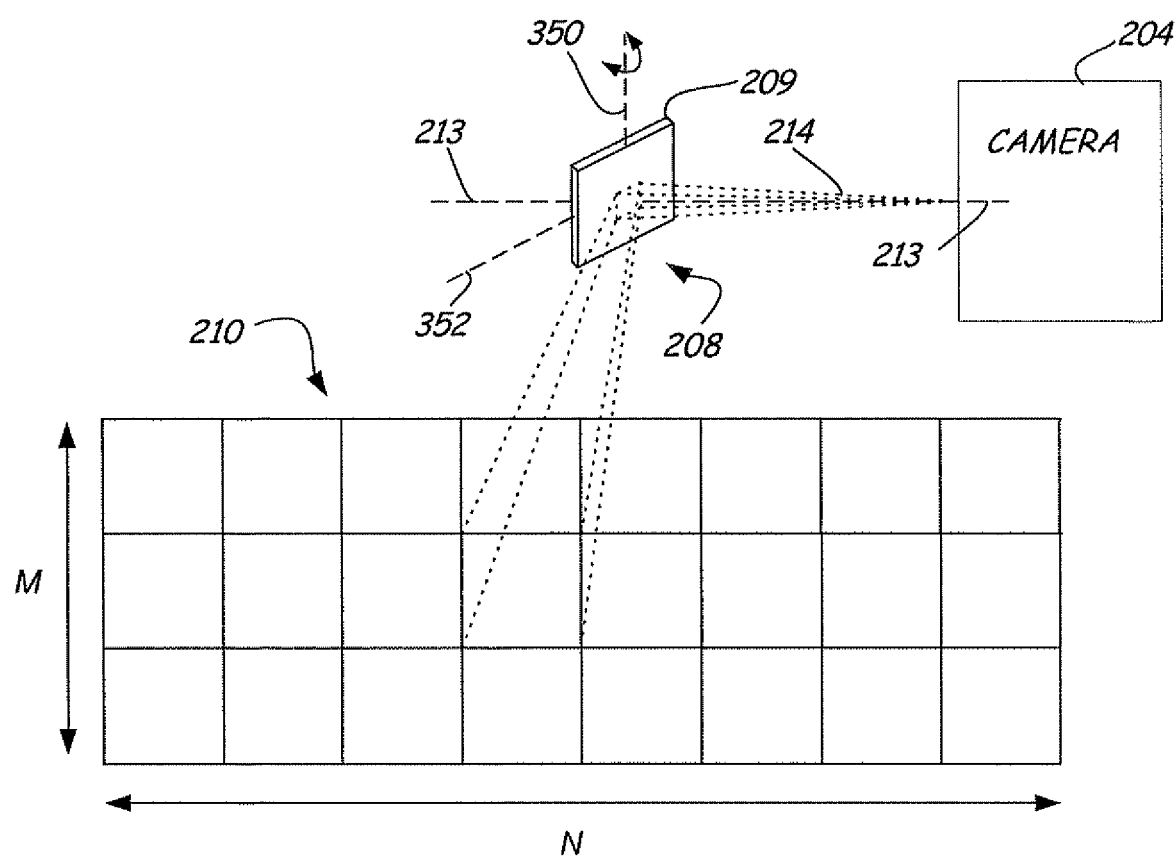
FIG. 5 illustrates an image acquisition system configured to perform a two-dimensional (2-D) scan to acquire images of a scene.

In the embodiment illustrated in FIG. 5, image directing device 208 is configured to perform a multi-dimensional scan of scene 210. As illustrated in FIG. 5, image directing device 208 includes a scan mirror 209 configured to pivot about a first pivot axis 350 and a second pivot axis 352. For instance, scan mirror 208 can be a 2-axis mirror. Pivot axis 350 is illustratively similar to pivot axis 330 of FIG. 3. Further, in the illustrated embodiment second pivot axis 352 is substantially perpendicular with respect to first axis 350. Scan mirror 209 is configured to pivot about multiple axes 350 and 352 to acquire M×N image frames from scene 210. While FIG. 5 illustrates a single, 2-axis scan mirror 209, it is noted that in other embodiments a plurality of scan mirrors can be utilized to perform a multi-dimensional scan of scene 210. For example, in one embodiment two scan mirrors can be utilized wherein a first scan mirror is configured to pivot about a first pivot axis and a second scan mirror is configured to pivot about a second pivot axis. Further, it is noted that in another embodiment a multi-dimensional scan can be performed of scene 210 using a single axis mirror. For example, scan mirror 209 can be configured to pivot about a single axis, such as axis 350. Further, camera 204 can be configured to pan, or tilt, in a vertical direction. Tilting movement of camera 204 and pivoting movement of scan mirror 209 can be controlled, and/or synchronized with image acquisition of camera 204, using a controller such as controller 220.

Figure 6:
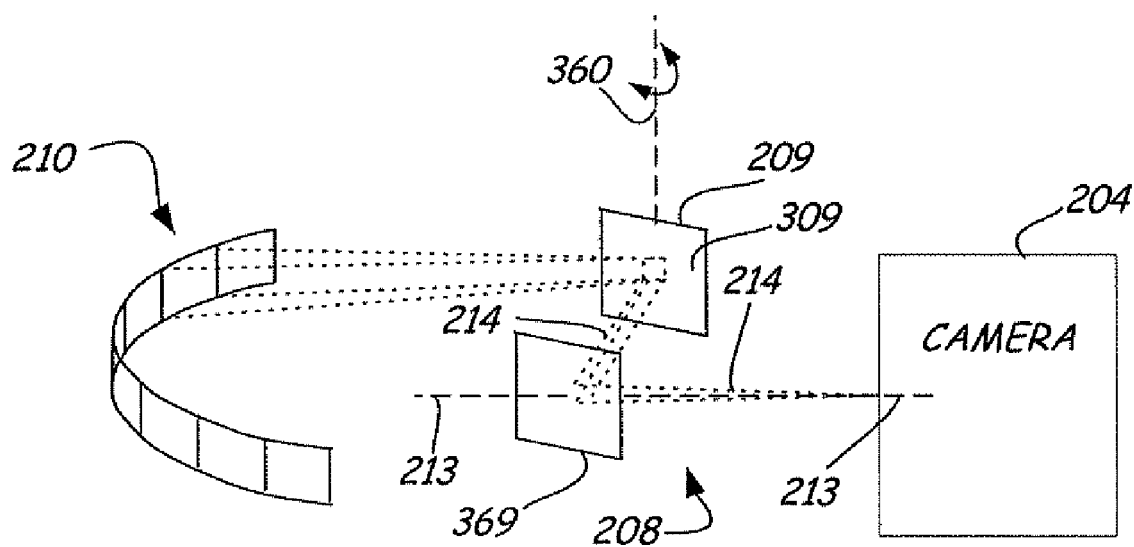
FIGS. 6 and 7 illustrate image acquisition systems configured to acquire images of a scene utilizing a plurality of image directing devices.
Figure 7:
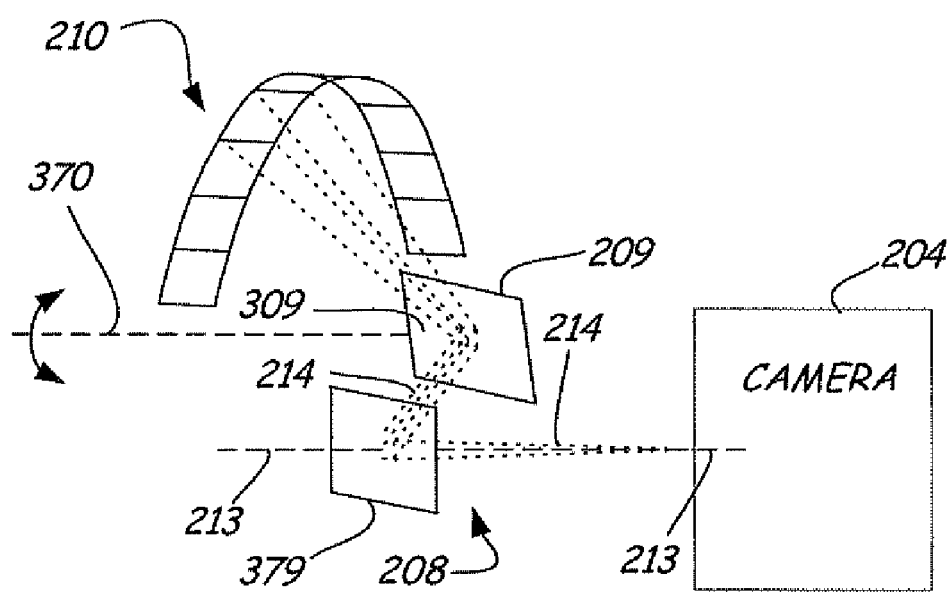

In the embodiments illustrated in FIGS. 6 and 7, image directing device 208 includes a plurality of mirrors utilized to acquire image data from scene 210. In FIG. 6, image directing device 208 includes a scan mirror 209 and a stationary mirror 369. Mirrors 209 and 369 direct image data along image path 214 to camera 204. Camera 204 receives the image data from path 214 along optical axis 213. Scan mirror 209 is configured to pivot about pivot axis 360, to direct images of scene 210 to a stationary mirror 369, which directs the images to camera 204. As illustrated in FIG. 6, axis 360 is parallel to a light-reflecting surface 309 of mirror 209. In one example, axis 360 is substantially in the same plane as the light-reflecting surface 309 of mirror 209. Further, pivot axis 360 defines a plane that is perpendicular or, substantially perpendicular, to optical axis 213. As illustrated, axis 360 is substantially vertical and axis 213 is substantially horizontal.

In FIG. 7, image directing device 208 includes a scan mirror 209 and a stationary mirror 379. Mirrors 209 and 379 direct image data along image path 214 to camera 204. Camera 204 receives the image data from path 214 along optical axis 213. Scan mirror 209 is configured to pivot about pivot axis 370 to direct light from frames of scene 210 to stationary mirror 379. In one embodiment, axis 370 is parallel to a light-reflecting surface 309 of mirror 209. For example, axis 370 can be substantially in the same plane as the light-reflecting surface 309 of mirror 209.

It is noted that the orientations of image directing device 208 illustrated in FIGS. 3-7 are exemplary and are not intended to limit the scope of the concepts described herein.

Figure 8:
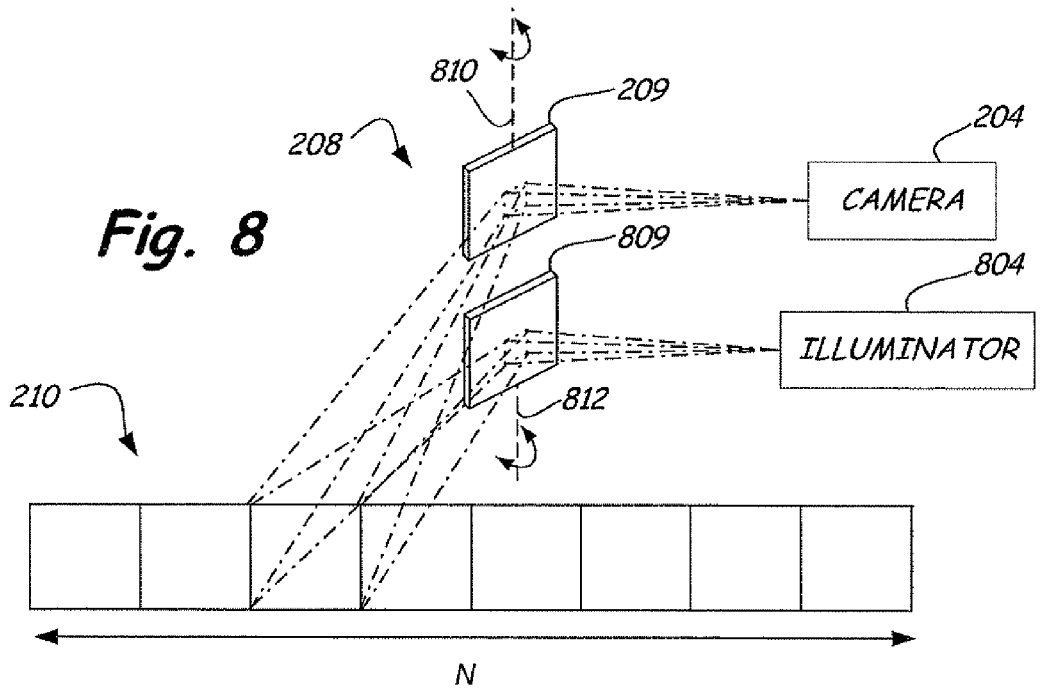
FIG. 8 is a schematic diagram of an embodiment of an image acquisition system including an illuminator.

In accordance with another embodiment, image acquisition component 102 is configured to acquire images in environments having low light levels. For example, image acquisition component 102 can be configured to acquire images at night. As illustrated in FIG. 8, an illuminator 804 is provided proximate camera 204 and is configured to provide light energy to enable camera 204 to obtain images of scene 210 in reduced light levels. Scan mirror 209 is configured to pivot about an axis 810 that is substantially similar to axis 330 illustrated in FIG. 3. However, it is noted that illuminator 804 and scan mirror 809 can also be utilized with the embodiments of image directing device 208 illustrated in FIGS. 4-7. Illuminator 804 includes a scan mirror 809 that is illustratively similar to scan mirror 209 and configured to pivot about an axis 812.

Scan mirror 809 can be synchronized with scan mirror 209 via a control signal. In this manner, illuminator 804 and camera 204 can be focused on the same portion of scene 210 such that the illuminator 804 is activated at substantially the same instance in time and on the same portion of the scene 210 as camera 204 acquires image data. Illuminator 804 is configured to transmit electromagnetic radiation including electromagnetic radiation having wavelengths in the visible light spectrum, as well as infrared or near-infrared radiation, and ultra-violet radiation, among others. In one embodiment, camera 204 is a multispectral and/or a hyperspectral imaging camera configured to simultaneously acquire images at multiple wavelengths.

Figure 9:
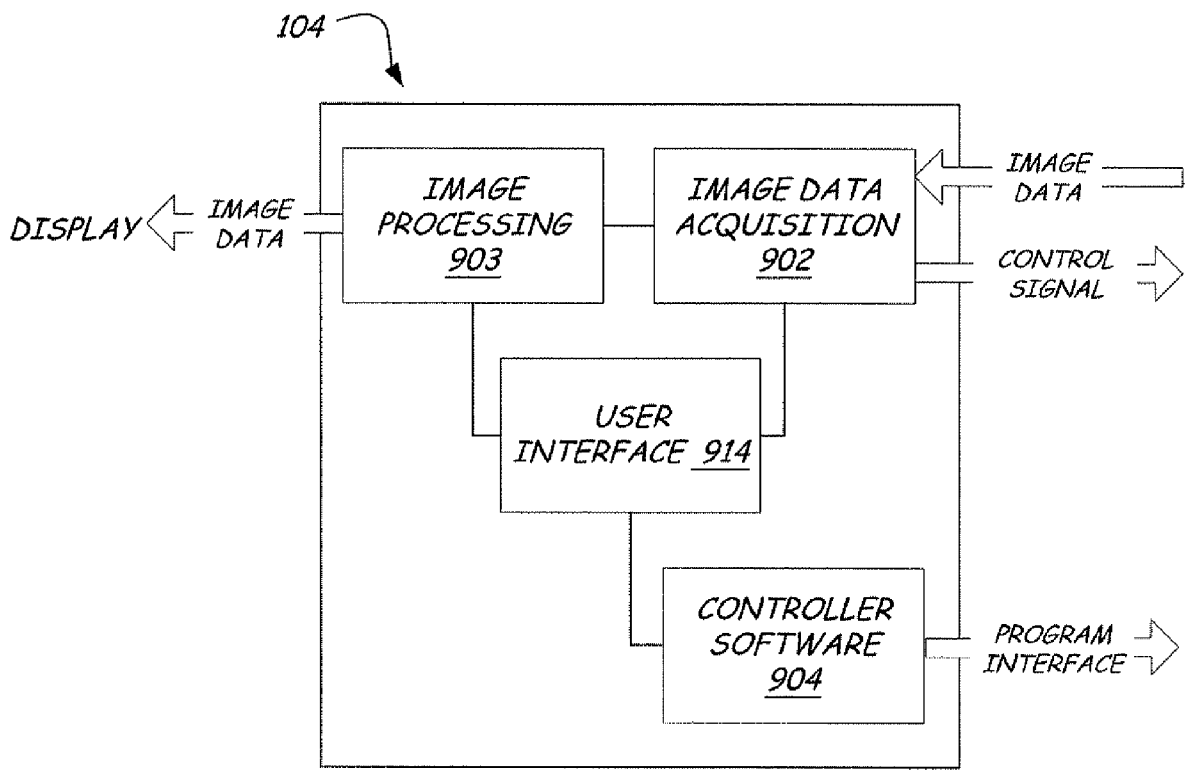
FIG. 9 is a schematic diagram of a processing component configured to process image data, under one embodiment.

FIG. 9 illustrates one embodiment of processing component 104. Processing component 104 receives image data from image acquisition component 102 at an image acquisition module 902. The image data received by processing component 104 from the image acquisition component 102 can be either analog or digital. In one particular example, the image data is communicated from image acquisition component 102 using a communication protocol such as Camera Link, or the like. Further, as discussed above, the image data received by processing component 104 can be data indicative of a video stream, a still image, a plurality of still images, among others.

Processing component 104 can include an analog-to-digital converter configured to receive an analog image data signal and output a digital signal representing the image. Further yet, component 104 can also be configured to compress the image data in real time using algorithms, such as, but not limited to, MPEG.

Image data acquisition module 902 can be configured to associate, with each portion of image data received from image acquisition component 102, spatial and/or time information. For example, module 902 can assign a time stamp to the image data indicative of a time at which the image data was acquired. Further, image data acquisition module 902 can associate a positional identifier with each frame of image data. For example, a positional identifier indicates an angular position of the scan mirror when the image data was acquired. In one embodiment, a counter is implemented that increments for each frame of image data received. The counter can be utilized to associate a frame number (e.g., N=1, N=2. . . N=80) to the acquired image data. It is noted that in other embodiments, image acquisition component 102 can be configured to provide spatial and/or time identifier information with the image data. For example, image acquisition component 102 can provide data such as a frame number or angular position of the scan mirror when the image data was acquired. Further, a time stamp can be provided with the image data. In one embodiment, a compass or global positioning system (GPS) receiver can be utilized to provide positional information with the image data.

Processing component 104 also includes an image processing module 903 configured to autostitch the plurality of frames of image data received by module 902 to form a wide area image. For example, module 903 can utilize positional information (such as frame number, etc.) to stitch the frames of image data. Module 903 can further be configured to remove overlapping image data and/or gaps from adjacent frames of image data.

Image processing module 903 also contains dedicated algorithms for performing target classification and change detection. Target classification contains processing logic to classify particular points or items of interest from the image data. For example, target classification can be configured to identify an unknown object as a person, a vehicle, an animal, to name a few, from the digital data representation of the acquired image.

Additionally, change detection is provided in module 903 and performs image registration and detects scene changes. Change detection can be performed by registering a frame, or frames, of image data and comparing successive frames of image data to each other. A number of testing procedures can be utilized to perform the change detection operations. For example, linear independence tests, vectorized tests, or edge motion tests can be utilized. Further, the change detection can be performed by utilizing application specific information such as region of interest or known sizes or shapes. In one embodiment, a Wronskian vector change detection algorithm is utilized. In this manner, a vector method is utilized that determines change at each image pixel (with respect to a reference image) based on a calculation using the test pixel and surrounding pixels in a square region (i.e., 3×3, 5×5, 7×7). In another embodiment, the spatial resolution of the change detection algorithm (the size of the square region) is utilized.

In one embodiment, change detection is performed on a plurality of frames of image data simultaneously. For instance, image processing module 903 receives a plurality of image data from frames 246 of scene 210. Image processing module 903 registers each frame of image data to provide a reference for performing change detection. Additional image data is acquired from frames 246 of scene 210 during subsequent cycles of scan mirror 209 through scan range 240. The additional image data from the frames are provided to image processing module 903. Image processing module 903 compares the image data to the registered image data to detect changes. In one embodiment, module 903 detects changes in each of the plurality of image frames on a continuous basis.

The image data can be supplemented or annotated based on detected changes. For example, the image processing module 903 can supplement the image data with a visual indicator (e.g., highlighting the area of the image data including the detected change). Further, an audible indicator can be provided such as an alarm or indictor light to indicate that a change in the image data has been detected. A detected change can include an unknown object as a person, a vehicle, an animal, to name a few, identified from the digital data representation of the acquired image.

Processing component 104 can include controller software 904 to program controller 220 of image acquisition component 102 used to control operation of the camera 204 and scan mirror 209 of image acquisition component 102. For instance, the controller software 904 can be used to program the synchronization and step size of the scan mirror 209. In one embodiment, processing component 104 sends a signal to an FPGA associated with controller 220 to re-configure an LUT containing mapping information of the camera 204 and scan mirror 209. It is noted that some of the processing functions illustrated within component 104 can be provided with image acquisition component 102 (for instance, within enclosure 248).

In one embodiment, processing component 104 is employed by a host computer and includes a user interface 914. A user utilizes the interface 914 to input control parameters. For instance, a user can define parameters such as scan rate, step size, scan range, etc. In one embodiment, a user inspects the autostitched image and, using a graphical user interface, provides a user input to reconfigure the scan mirror step size. For instance, a user can modify the number of frames acquired from scene 210 or modify the field-of-view for each frame 246. The user input can be utilized to reconfigure controller 220 for controlling camera 204 and image directing device 208.

The user interface 914 can provide a visual user interface for display of operating parameters and image data. For example, user interface 914 can provide a visual output from image processing module 903. A monitor can be provided to display an indication that a point or item of interest has been detected, such as a person, automobile, boat, airplane, animal, etc. The user can adjust parameters (i.e., sensitivity, range, points of interest) through interface 914.

The image data can be provided to a storage component, such as storage component 106 illustrated in FIG. 1. The stored image data can include a plurality of image frames stored as separate data files. In another embodiment, the autostitched image provided by image processing module 903 is stored in the storage component.

The image data can be provided to the storage component in compressed state to reduce the required memory for storing the image data. In one embodiment, the image data includes position and/or time stamp information associated with the image data stored in storage component 106. Processing component 104 can further be configured to retrieve and process archived image data from the storage component 106. For example, the image data can be retrieved using the position and/or time stamp information associated with the stored image data. In this manner, data can be retrieved from the storage component 106 based on the time at which the image data was acquired and/or the spatial position of the image data (e.g., a frame number).

Figure 10:
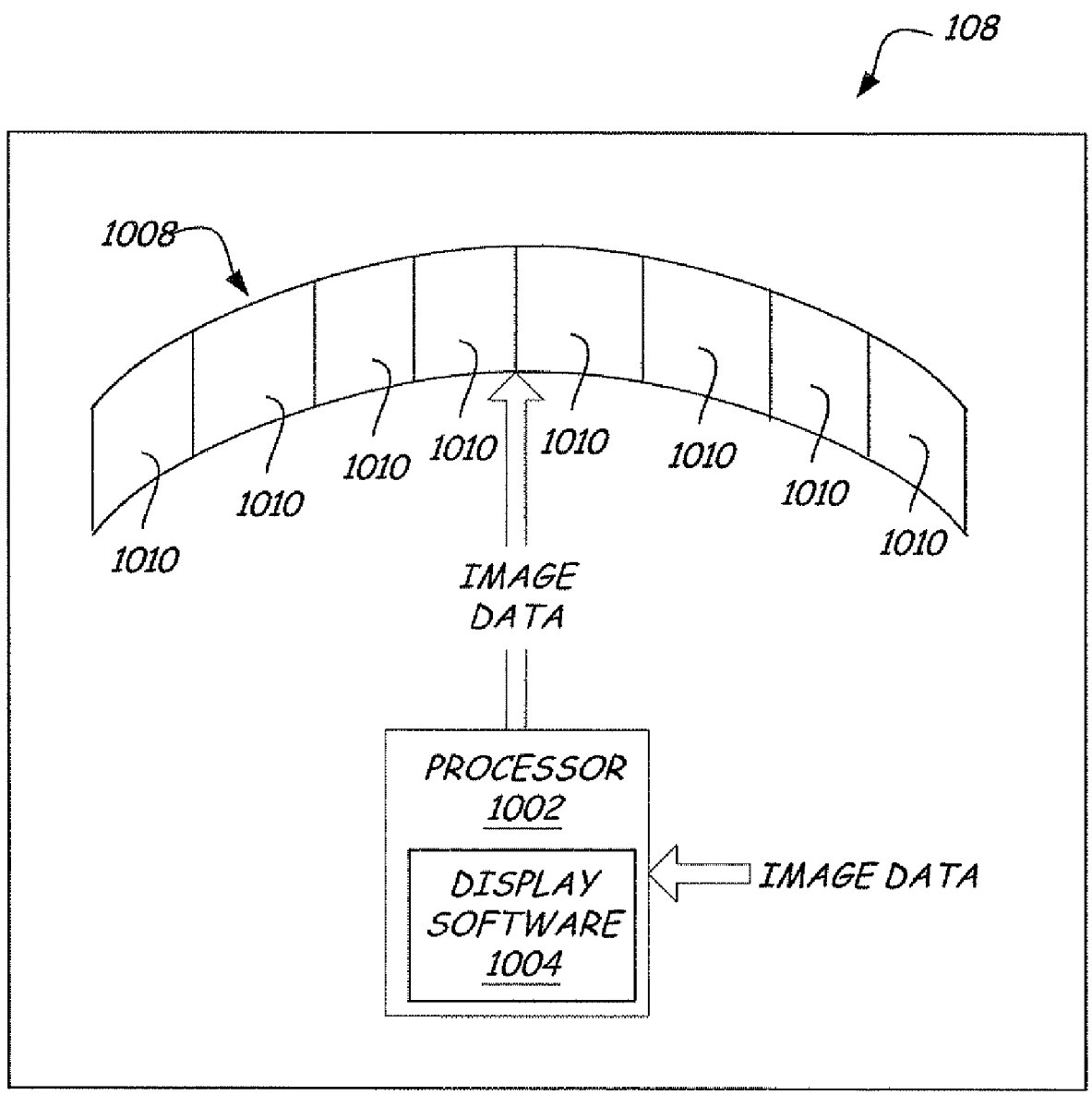
FIG. 10 is a schematic diagram of a display component configured to display image data, under one embodiment.

In accordance with another embodiment, the processed image data is provided to a display component, such as display component 108 illustrated in FIG. 1. FIG. 10 illustrates one embodiment of display component 108. In the illustrated embodiment, display component 108 includes a processor 1002 configured to receive image data and provide the image data to a display device 1008 configured to visually render the image data.

In accordance with one embodiment, display software 1004 provides further processing of the image data. For instance, the software 1004 can analyze the image data and remove overlapping data and/or gaps between adjacent frames. Further, software 1004 implemented on processor 1002 utilizes positional information provided with portions of the image data (i.e., frame) to arrange the image data on display 1008.

Further, a brightness and/or contrast of the image data can be adjusted by modifying a camera exposure time and/or using a histogram equalization. Adjustment of the brightness and/or contrast can be performed either manually (i.e., a user enters parameters to control the camera exposure time) or automatically (i.e., a processing component adjusts the camera exposure time based on observed brightness and/or contrast).

The processor 1002 displays the image data simultaneously on multiple displays 1010. For example, the image data can be rendered on a frame-by-frame basis to a plurality of monitors wherein one or more frames of image data are displayed on a separate monitor. As illustrated, eight (8) monitors 1010 are arranged in a semicircle such that the plurality of monitors "wrap" around a user to maintain a constant viewing distance between the user and each of monitors 1010. However, any number of monitors can be utilized to display the image data. For example, in one embodiment eighty (80) monitors 1010 can be utilized.

Processor 1002 can be implemented on a computer having multiple outputs (for example, multiple PCI express slots). In this manner, multiple displays (i.e., multiple monitors) can be driven by a single computer to enable enhanced synchronization of the multiple displays.

As described above, image acquisition device 102 is configured to acquire image data over successive and repeating cycles of scan mirror 209 of scene 210. The image data acquired from the successive scans is provided to display component 108, and is frequently updated based on the framing rate at which the successive scans of image data are acquired. For instance, image acquisition component 102 acquires image data across scan range 240 one or more times per second. The image data can be provided in real-time to display component 108. In this manner, the images displayed on display device 1008 can be refreshed several times per second. Further, the processor 1002 is configured to display image data from the successive scans of scene 210 (e.g., Frame 1, Frame 2, Frame 3, etc.) in a stationary, or substantially stationary position on display device 708. For instance, additional image data acquired from scene 210 during the successive scans is provided to display device 1008 such that each frame of image data (i.e., frame 1, frame 2, frame N, etc.) is provided in a similar position and orientation on display device 1008. In this manner, the displayed image data of scene 210 does not have the appearance of "scrolling" across display 1008.

Further, in one embodiment display 1008 is configured to visually render the detected changes in the image data. For instance, processor 1002 can be configured to visually render to display 1008 an indication of a detected change, such as a mark or highlighted indication. For example, a visual mark or identifier can be utilized to overlay a detected change in the image data. Further, an audible indication such as an audible alarm can be provided to indicate that a change has been detected. The visual and/or audio indication can indicate the presence of an unknown object such as a person, a vehicle, an animal, or the identification of an object of interest, such as a vehicle or person of interest in the image data.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the recording medium while maintaining substantially the same functionality without departing from the scope and spirit of the present invention.

What is claimed is:

1. An image acquisition system for capturing images of scenes, the system comprising:
   a stationary image acquisition device that receives optical images; and
   a light-directing device that pivots about a pivot axis and directs scene images to the image acquisition device, wherein the light-directing device pivots over a scan range that is less than 360 degrees, wherein the light-directing device is a scan mirror, and wherein the pivot axis of the scan mirror is substantially parallel to a light-reflecting surface of the scan mirror.

2. The image acquisition system of claim 1, wherein the image acquisition device is configured to receive optical images along an optical axis and the light-directing device is configured to direct scene images toward the image acquisition device along an optical path, and wherein the pivot axis of the light-directing device defines a plane that is substantially perpendicular to the optical axis.

3. The image acquisition system of claim 1, wherein the light-directing device is configured to direct scene images toward the image acquisition device along an optical axis of the image acquisition device, and wherein the pivot axis of the light-directing device is substantially perpendicular to the optical axis.

4. The image acquisition system of claim 3, wherein a first scan range boundary defines a first rotational limit of the light-directing device and a second scan range boundary defines a second rotational limit of the light-directing device, wherein the light-directing device is configured to pivot in a predetermined path between the first and second scan range boundaries in repeating cycles.

5. The image acquisition system of claim 4, wherein the light-directing device pivots about the pivot axis over a scan range that is less than 90 degrees.

6. The image acquisition system of claim 5, wherein the pivot axis of the light-directing device is substantially vertical.

7. The image acquisition system of claim 5, wherein the pivot axis of the light-directing device is oriented at an angle relative to vertical.

8. The image acquisition system of claim 3, wherein the pivot axis of the light-directing device is a first pivot axis, and wherein light-directing device is configured to pivot about a second pivot axis that is substantially perpendicular to the first pivot axis.

9. The system of claim 3, and further comprising an illuminator configured to transmit light energy to illuminate a scene, and wherein the image acquisition device is responsive to the transmitted light energy.

10. The system of claim 3, wherein the image acquisition device includes at least one of a multispectral and hyperspectral imaging camera configured to simultaneously acquire images at multiple wavelengths.

11. The image acquisition system of claim 3, and further comprising:
   an actuator operably coupled to the light-directing device, wherein the actuator is configured to pivot the light-directing device about the pivot axis between a plurality of angular positions; and
   a controller configured to control operation of the actuator to pivot the light-directing device to a selected one of the plurality of angular positions, wherein the controller is further configured to control the image acquisition device to acquire an optical image from the optical axis when the light-directing device is at the selected one of the plurality of angular positions.

12. The system of claim 11, wherein the controller includes synchronization information that maps the plurality of angular positions of the light-directing device to a field of view of the image acquisition device.

13. An image acquisition system for capturing images of a scene, the system comprising:
   an image acquisition device that receives scene images along an optical image path and generates a digital data representation of the optical images; and
   a light-directing device that directs optical images toward a stationary imaging lens associated with the image acquisition device, wherein the light-directing device pivots about a pivot axis over a plurality of angular positions that collectively define a scan range, and wherein the light-directing device is oriented such that optical images received by the image acquisition device are generally oriented in the same direction at each angular position throughout the scan range.

14. The image acquisition system of claim 13, wherein the light-directing device pivots over the plurality of angular positions in a predetermined path in repeating cycles, and wherein the image acquisition device is substantially stationary with respect to the scene.

15. The image acquisition system of claim 14, wherein the image acquisition device is configured to receive optical images along an optical axis, and wherein the pivot axis of the light-directing device is substantially perpendicular to the optical axis.

16. The image acquisition system of claim 14, wherein the light directing device is a mirror having a light reflecting surface, and wherein the pivot axis of the mirror is substantially parallel to the light reflecting surface.

17. A method of acquiring scene images, comprising:
providing an image acquisition device;
providing a light-directing device that directs images of a scene toward the image acquisition device;
pivoting the light-directing device about a pivot axis between a plurality of angular positions, wherein pivoting comprises pivoting the light-directing device in repeating cycles over an angular scan range that is less than 90 degrees;
acquiring, at the image acquisition device, a plurality of image frames at the plurality of angular positions; and
rendering the acquired plurality of image frames to a display device, wherein rendering includes generating an image stream of the scene from the image data acquired at each of the plurality of angular positions.

18. The method of claim 17, wherein pivoting comprises:
pivoting the light-directing device back-and-forth between a first limit of the scan range and a second limit of the scan range.

19. The method of claim 18, and further comprising:
acquiring, at the image acquisition device, additional image data for each of the plurality of angular positions during the repeating cycles; and
rendering the additional image data for each of the plurality of angular positions to the display device such that the rendered image data represents an image stream of the scene.

20. The method of claim 18, and further comprising:
acquiring a first portion of image data for each of the plurality of angular positions during a first cycle of the repeating cycles;
acquiring a second portion of image data for each of the plurality of angular positions during a second cycle of the repeating cycles; and
performing change detection on the second portion of image data for each of the plurality of angular positions to identifying changes in the image data.

* * * * *